(12) United States Patent
Nayar et al.

(10) Patent No.: US 6,886,234 B2
(45) Date of Patent: May 3, 2005

(54) TOP COVER REMOVAL MACHINE FOR DISC DRIVES

(75) Inventors: Sham S. Nayar, Savage, MN (US); James J. Stirn, Savage, MN (US)

(73) Assignee: Seagate Technology LLC, Scotts Valley, CA (US)

(*) Notice: Subject to any disclaimer, the term of this patent is extended or adjusted under 35 U.S.C. 154(b) by 280 days.

(21) Appl. No.: 10/185,323

(22) Filed: Jun. 28, 2002

(65) Prior Publication Data

US 2003/0135973 A1 Jul. 24, 2003

Related U.S. Application Data

(60) Provisional application No. 60/350,795, filed on Jan. 22, 2002.

(51) Int. Cl.[7] ............................ B23P 19/00; B23P 19/02
(52) U.S. Cl. ..................... 29/426.5; 29/426.4; 29/426.6; 29/762
(58) Field of Search ........................... 29/426.5, 426.4, 29/426.6, 402.03, 762, 426.1; 174/50.5; 117/54, 55, 56, 64, 60; 118/400, 416, 423

(56) References Cited

U.S. PATENT DOCUMENTS

| | | |
|---|---|---|
| 4,669,011 A | 5/1987 | Lemke ........................ 360/103 |
| 5,153,785 A | 10/1992 | Muranushi et al. ............ 360/75 |
| 5,896,246 A | 4/1999 | Budde et al. ................ 360/104 |
| 5,898,541 A | 4/1999 | Boutaghu et al. ............ 360/109 |
| 5,943,189 A | 8/1999 | Boutaghou et al. .......... 360/103 |
| 6,046,888 A | 4/2000 | Krinke et al. ................ 360/104 |
| 6,181,531 B1 | 1/2001 | Kshikawa et al. ......... 360/294.4 |
| 6,265,806 B1 | 7/2001 | Suzuki ....................... 310/309 |
| 6,335,850 B1 | 1/2002 | Dunsfield et al. ......... 360/294.5 |
| 6,360,035 B1 | 3/2002 | Hurst, Jr. et al. ............. 385/18 |
| 6,362,542 B1 | 3/2002 | Novotny ...................... 310/12 |
| 6,366,416 B1 | 4/2002 | Meyer et al. ................. 360/25 |
| 6,497,026 B1 * | 12/2002 | Traver et al. ............ 29/402.08 |

* cited by examiner

Primary Examiner—John C. Hong
(74) Attorney, Agent, or Firm—Westman, Champlin & Kelly, P.A.

(57) ABSTRACT

The present invention is an apparatus and a method for removing a top cover from a disc drive. In accordance with one embodiment of the invention, an apparatus comprises a wedge configured to fit between the top cover and the base of the disc drive. The embodiment further comprises an actuator configured to drive the wedge with a sufficient driving force to separate the top cover from the base of the disc drive. The embodiment further comprises a crowder configured to support the disc drive, wherein the crowder is disposed to oppose the driving force imparted to the disc drive by the actuator. Finally, the embodiment comprises a top cover holder configured to remove the top cover. The present invention includes a method for implementing the steps performed by the embodiment of the apparatus.

19 Claims, 6 Drawing Sheets

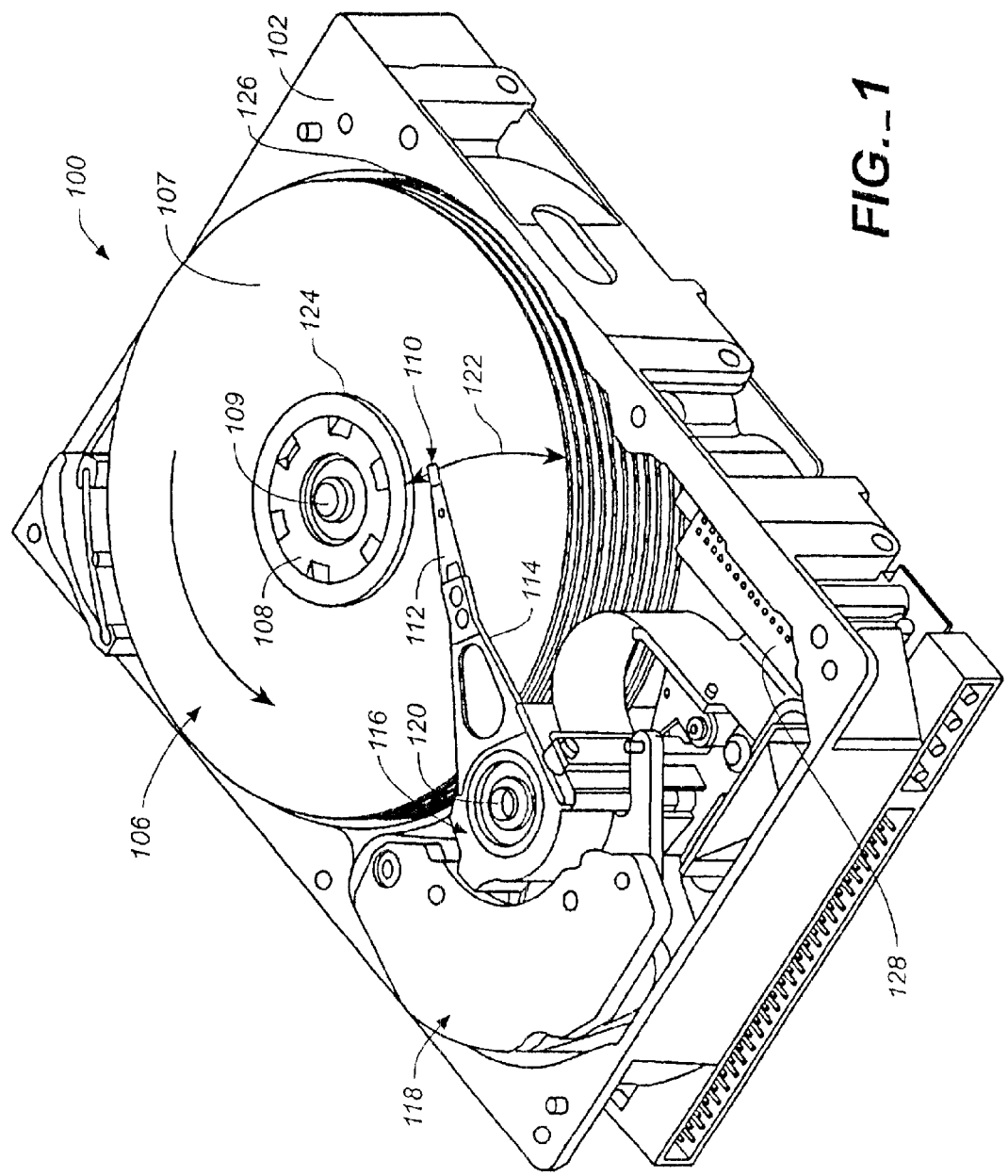
FIG._1

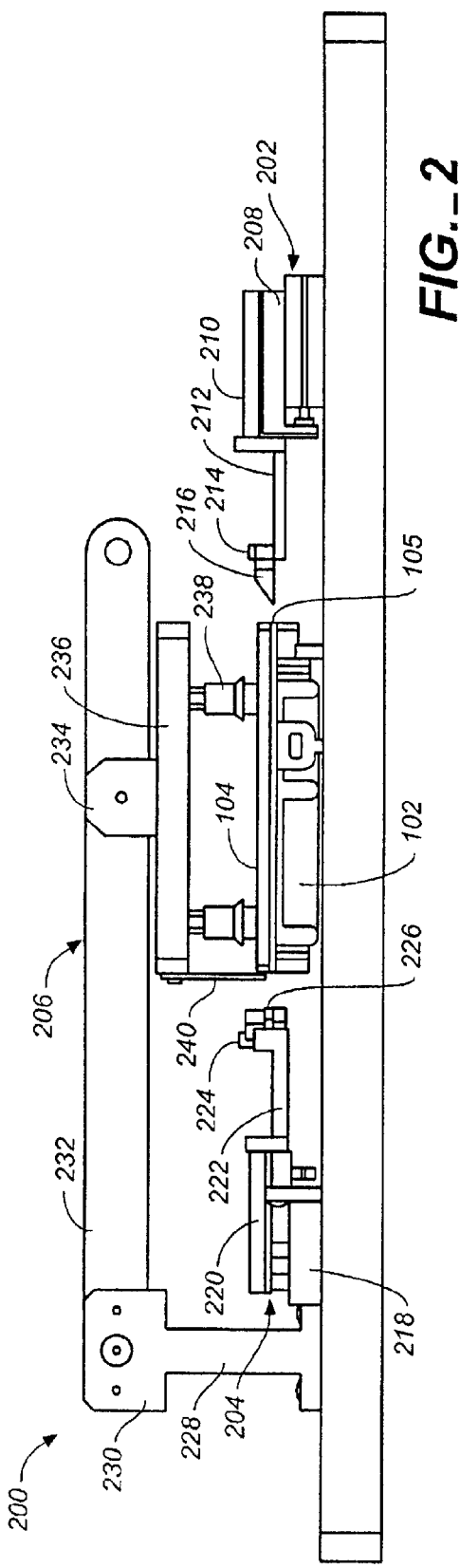
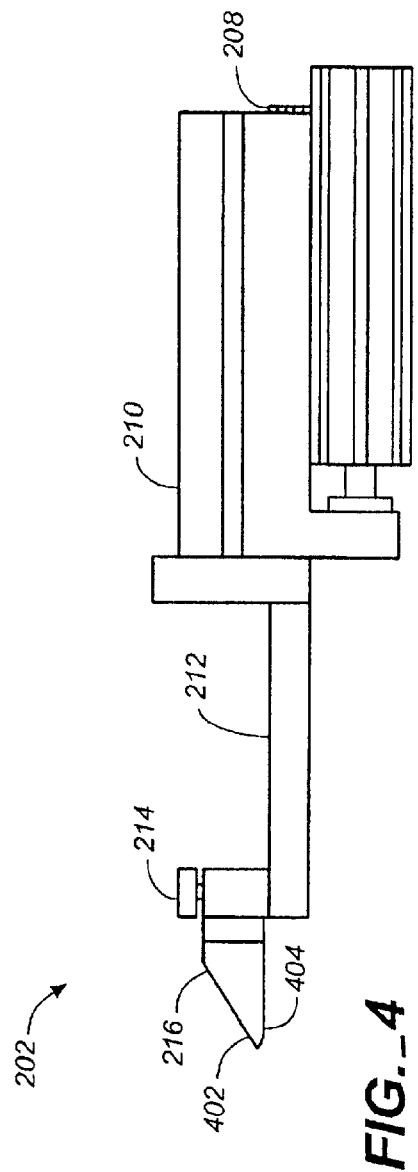

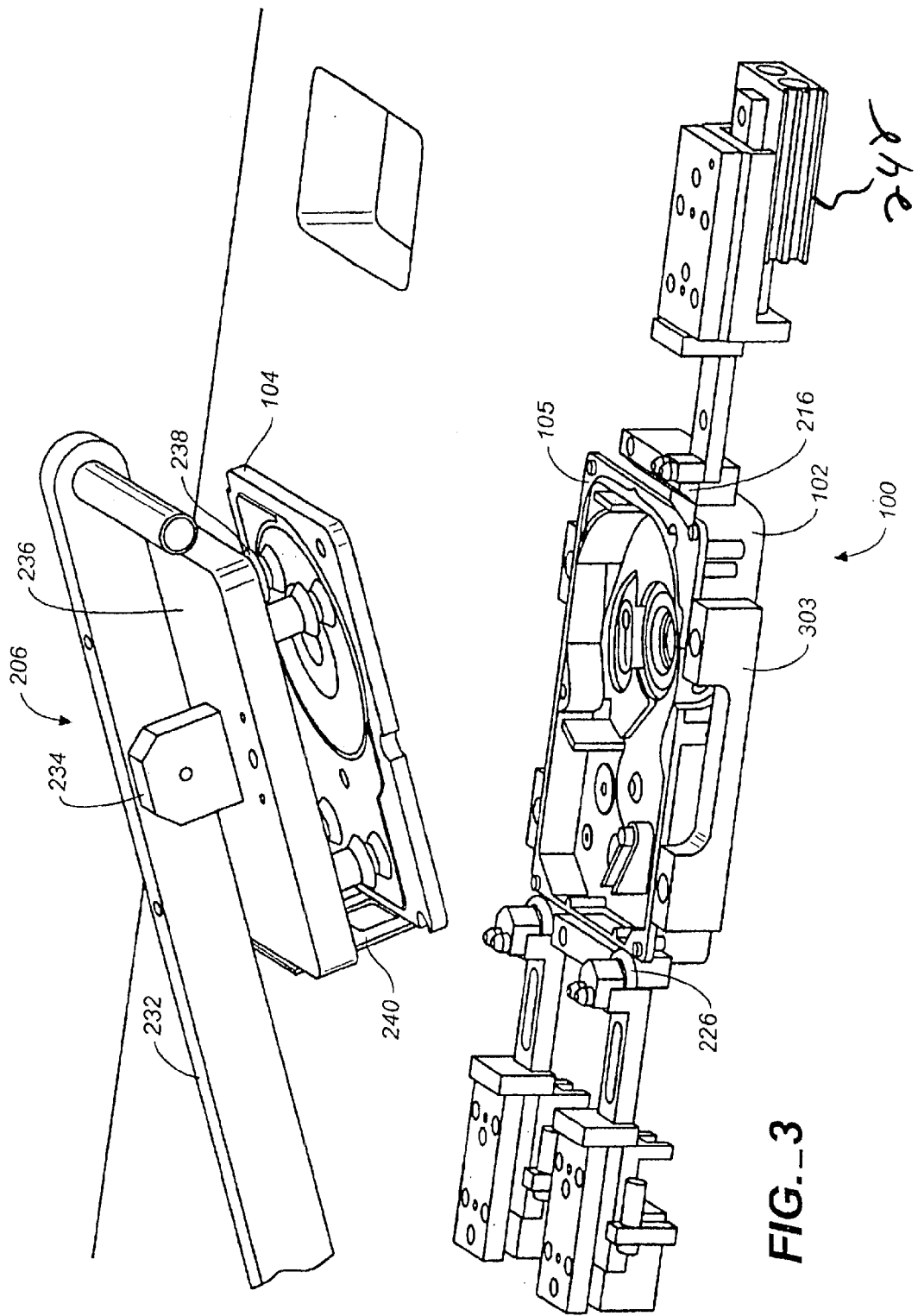
FIG._3

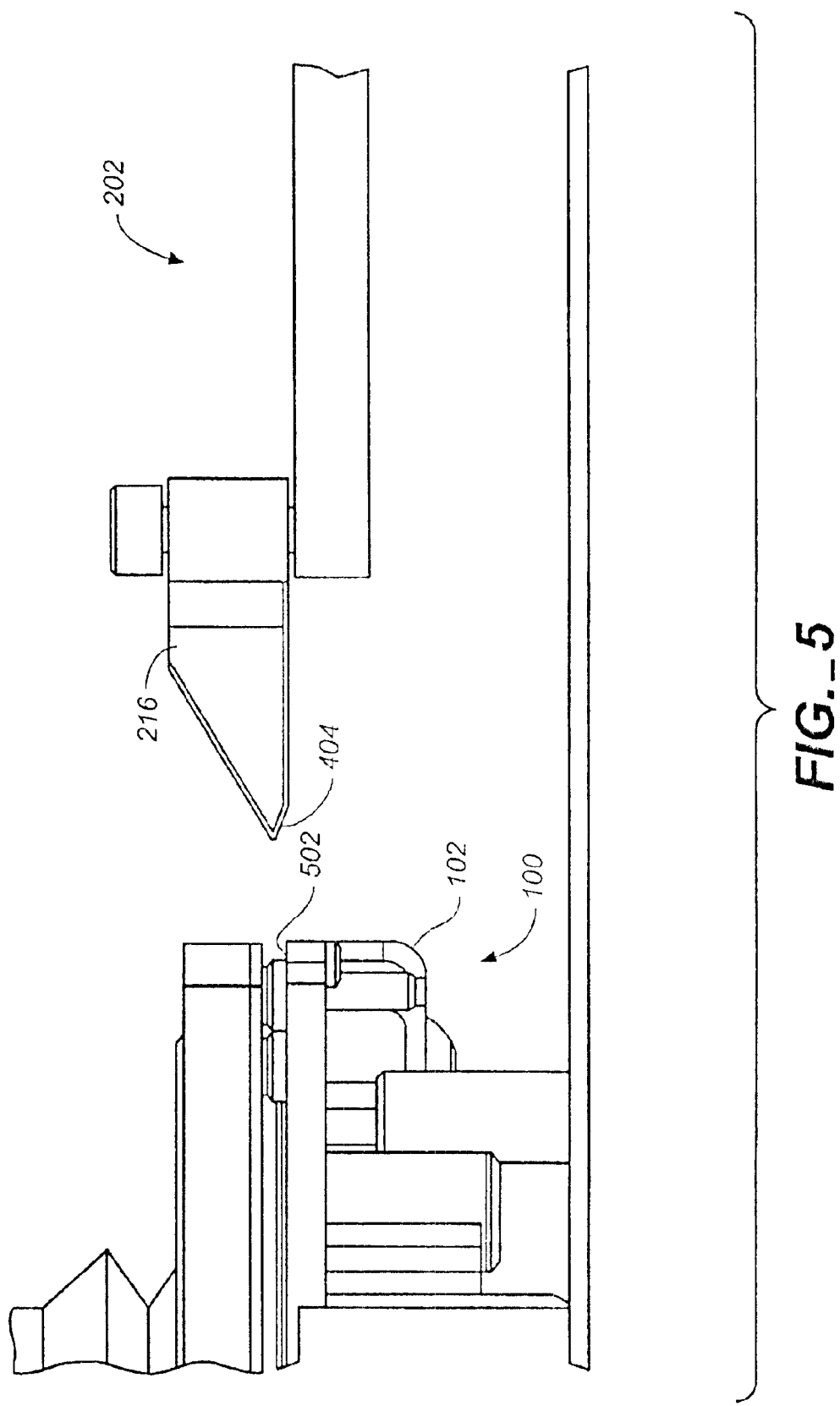
FIG._5

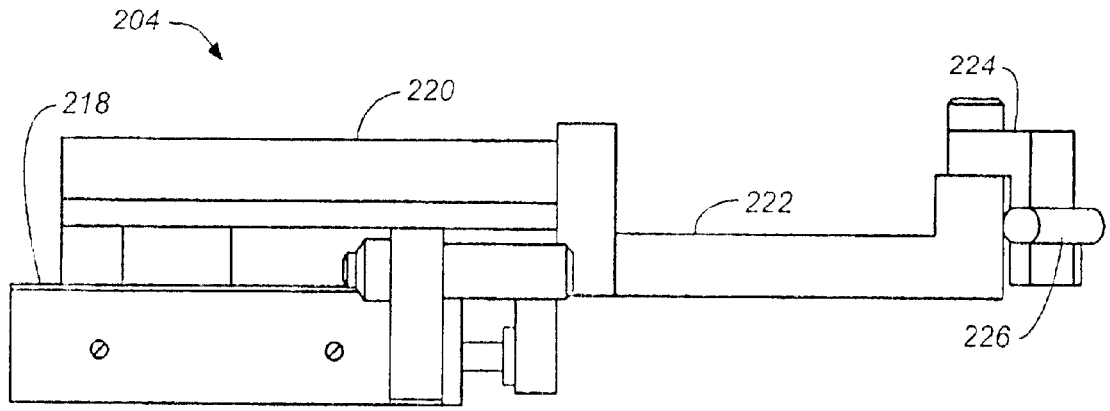
FIG._6
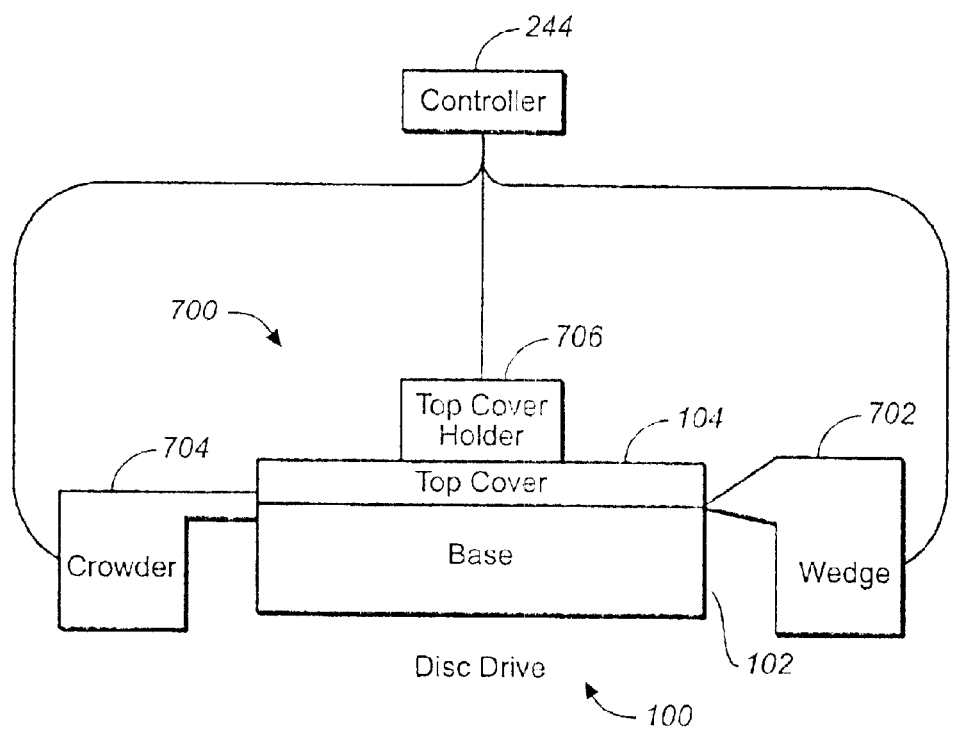
FIG._7

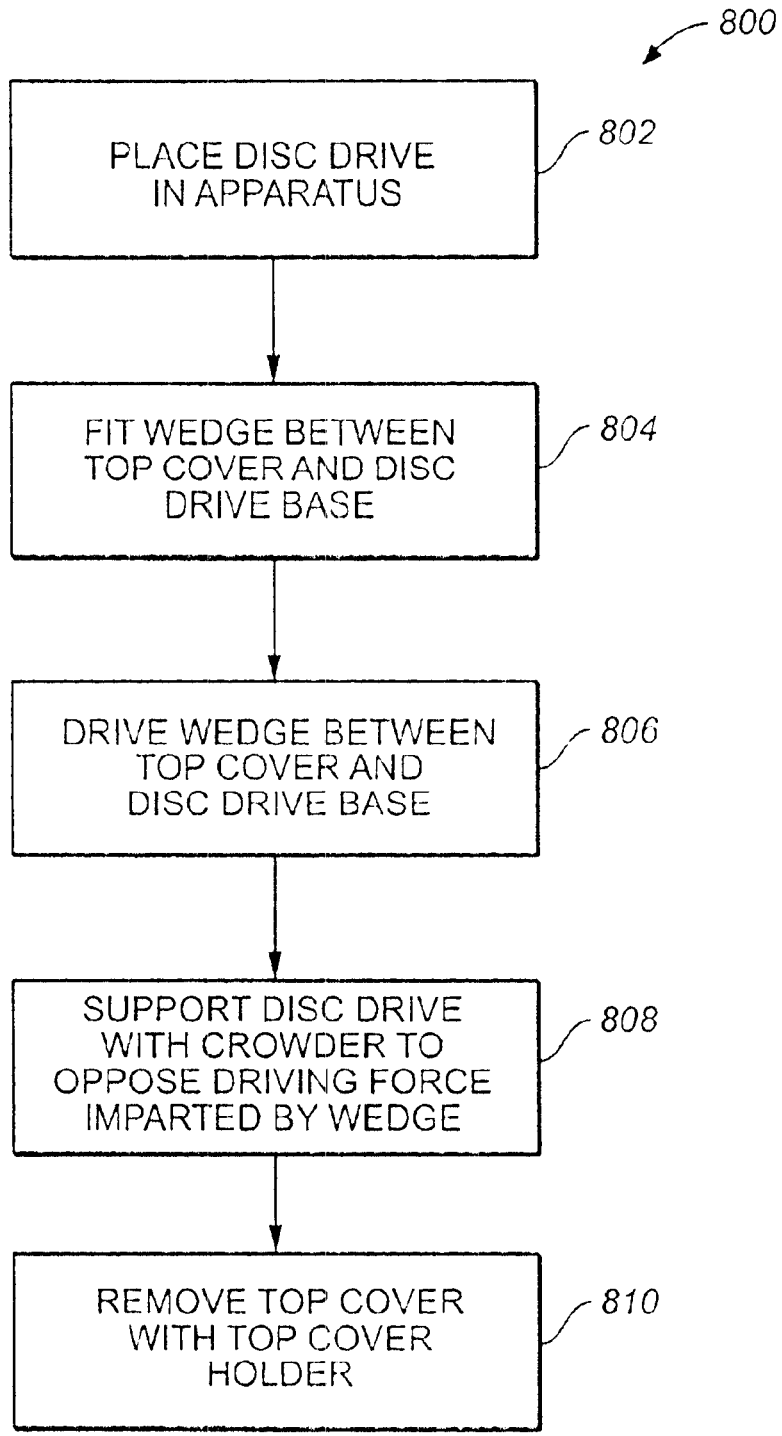
FIG._8

TOP COVER REMOVAL MACHINE FOR DISC DRIVES

CROSS-REFERENCE TO RELATED APPLICATION

This application claims priority from U.S. Provisional Application No. 60/350,795 filed on Jan. 22, 2002 for inventors Sham S. Nayar and James J. Stirn and entitled TOP COVER REMOVAL MACHINE FOR DISC DRIVES.

FIELD OF THE INVENTION

The present invention relates generally to disc drive manufacturing tools, and more particularly but not by limitation to tools to open disc drives.

BACKGROUND OF THE INVENTION

Disc drives are common data storage devices. A typical disc drive includes a rigid housing or deck that encloses a variety of disc drive components. The components include one or more discs having data surfaces coated with a medium for storage of digital information in a plurality of circular, concentric data tracks. The discs are mounted on a spindle motor that causes the discs to spin and the data surfaces of the discs to pass under respective hydrodynamic or aerodynamic bearing disc head sliders. The sliders carry transducers, which write information to and read information from the data surfaces of the discs. The disc drive is isolated from the outside world by a top cover sealed to the disc drive by adhesive gaskets.

There has been a long standing need for a simple and rapid means to remove the top cover from the disc drive that does not damage the disc in the process. Typical techniques can cause damage to the disc drive, the top cover, or the internal components of the disc drive. Commonly, disc drive components have been exposed to excessive shock during the removal efforts. Consequently, the disc drive components suffer damages from shock such as head slap and surface scratches.

Known approaches for removing the top cover generally fall into two types. The first approach is for operators to remove the top covers manually. In the past, hand tools or even screwdrivers have been used to pry open the top covers. The success of this manual technique is highly dependent on the skills of the individual operator. It is neither rapid nor reliable. It is also not suitable for large-scale disassembly processes. In addition, a common result of this manual technique has been to impart excessive shock to the disc drive and damage the disc drive components. A second approach has been to use a dedicated machine for removal of the top cover. However, such a device may shock the drives, or may not adapt to high volume rework production lines. Such devices typically work as stand alone tools.

Embodiments of the present invention address these and other problems, and offer other advantages over the prior art.

SUMMARY OF THE INVENTION

The present invention relates to a top cover removal machine which addresses the above problems.

In accordance with one embodiment of the invention, an apparatus comprises a wedge configured to fit between the top cover and the base of the disc drive. The embodiment further comprises an actuator configured to drive the wedge with a sufficient driving force to separate the top cover from the base of the disc drive. The embodiment further comprises a crowder configured to support the disc drive, wherein the crowder is disposed to oppose the driving force imparted to the disc drive by the actuator. Finally, the embodiment further comprises a top cover holder configured to remove the top cover. The present invention includes a method for implementing the steps performed by the embodiment of the apparatus.

These and various other features as well as advantages which characterize the present invention will be apparent upon reading the following detailed description and review of the associated drawings.

BRIEF DESCRIPTION OF THE DRAWINGS

FIG. 1 is an isometric view of a disc drive.

FIG. 2 is a side view of an apparatus embodying features of the present invention.

FIG. 3 is an isometric view of an apparatus embodying features of the present invention.

FIG. 4 is a side view of an embodiment of the wedge subassembly.

FIG. 5 is an isometric view of an embodiment of the wedge subassembly and its alignment with the base of a disc drive.

FIG. 6 is a side view of an embodiment of the crowder subassembly.

FIG. 7 is a block diagram of the apparatus.

FIG. 8 is a block diagram of the method for implementing the invention.

DETAILED DESCRIPTION OF ILLUSTRATIVE EMBODIMENTS

FIG. 1 is an isometric view of a disc drive 100 in which embodiments of the present invention are useful. Disc drive 100 includes a housing with a base 102 and a top cover 104 (not shown). Base 102 is adhered to top cover 104 by a gasket 105 (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 128 based on signals generated by heads 110 and a host computer (not shown).

FIG. 2 is a side view of an embodiment of the present invention. The embodiment is an apparatus for removing the top cover from a disc drive. FIG. 2 depicts the apparatus 200 with a disc drive installed, but prior to operation of the apparatus. The apparatus comprises three major elements; the floating wedge sub-assembly 202, the crowder sub-assembly 204, and the top cover holder sub-assembly 206. Floating wedge subassembly 202 inserts a wedge 216 between top cover 104 and base 102 of disc drive 100. Wedge 216 is driven with sufficient force to break the gasket bond between top cover 104 and base 102. Crowder subassembly 204 is disposed so as to oppose the relative motion imposed upon disc drive 100 by floating wedge subassembly 202. Top cover holder subassembly 206 holds onto top cover 104 and removes it from base 102.

Floating wedge sub-assembly 202 comprises a wedge pneumatic slide 208, a mount plate 210, a wedge bracket 212, a shoulder bolt 214 and a floating wedge 216. When wedge pneumatic slide 208 is activated, it extends along its axis, driving mount plate 210. Mount plate 210 serves to connect wedge pneumatic slide 208 to wedge bracket 212. Wedge bracket 212 serves as an attachment point for shoulder bolt 214. Floating wedge 216 is attached by shoulder bolt 214 to wedge bracket 212. Shoulder bolt 214 is taller than the portion of floating wedge 216 to which it connects. Shoulder bolt 214 is also smaller in diameter than the diameter of the hole through floating wedge 216. Both of these physical characteristics permit floating wedge 216 to smoothly rise or fall, float, as it engages disc drive 100. When apparatus 200 is in operation, wedge pneumatic slide 208 drives floating wedge 216 between top cover 104 and base 102. The top edge of floating wedge 216 lifts top cover 104 as the bottom edge of floating wedge 216 presses down on base 102. Floating wedge 216 compensates for any change in height floating wedge 216 needs to undergo as it forces top cover and base apart.

Crowder sub-assembly 204 comprises a crowder pneumatic slide 218, a mounting plate 220, a crowder bracket 222, a crowder block 224 and an o-ring crowder 226. When crowder pneumatic slide 218 is activated, it extends along its axis, driving mount plate 220. Mount plate 220 serves to connect crowder pneumatic slide 218 to the crowder bracket 224. Crowder bracket 222 serves as an attachment point for crowder block 224. Crowder block 224 supports o-ring crowder 226. O-ring crowder 226 is comprised of a "clean room safe" rubber. The variety of rubber used varies with the conditions of use. For one embodiment of the invention, a fluoroelastomer having a 70-durometric value is used. This particular fluoroelastomer is sold under the trademark "Viton" by DuPont Dow Elastomers L.L.C., Bellevue Corporate Center, 300 Bellevue Parkway, Wilmington, Del. 19809. When apparatus 200 is in operation, crowder pneumatic slide 218 drives crowder block 224 into disc drive 100 and drives o-ring crowder 226 between top cover 104 and base 102. Crowder block 224 opposes the driving force put on disc drive 100 by the driving force imparted by floating wedge 216. In addition, crowder block 224 acts to hold down base 102 during the removal of top cover 104.

Top cover holder sub-assembly 206 comprises a support leg 228, a pivot mechanism 230, a lever arm 232, an angular compliance 234, a vacuum plate 236, a suction cup 238, a guard plate 240, and an actuator 242 (not shown). Support leg 228 provides structural support for top cover holder sub-assembly 206. Pivot mechanism 230 is disposed between support leg 228 and lever arm 232. Angular compliance 234 serves to link lever arm 232 and vacuum plate 236. During operation of apparatus 200, the angular relationship between lever arm 232 and vacuum plate 236 changes. Angular compliance 234 allows the angular relationship between lever arm 232 and 236 to change. Vacuum plate 236 supports one or more suction cups 238. During operation of apparatus 200, suction cup(s) 238 hold onto top cover. Guard plate 240 is provided to keep top cover from dropping. Actuator 242 serves to lift lever arm 232, vacuum plate 236 and top cover it is holding. Other embodiments omit actuator 242 and are manually actuated.

During operation of apparatus 200, an embodiment of the invention functions in the following way. Disc drive 100 is placed within apparatus 200. A controller 244 (not shown) simultaneously actuates both wedge pneumatic slide 208 and crowder pneumatic slide 218. Floating wedge 216 and crowder 226 are both driven toward disc drive 100. At the same time, the suction cups 238 are activated to hold top cover. Moments later, floating wedge 216 goes between top cover 104 and base 102 at the same moment crowder 226 breaks the gasket bond. Moments later, actuator 242 operates, lifting top cover 104. The upward force on base 102 is counteracted by crowder block 224. At the end of the complete operation, top cover 104 is completely free of base 102.

FIG. 3 is an isometric view of an apparatus embodying features of the present invention. FIG. 3 illustrates the apparatus at the end of its work cycle, having completely removed top cover 104 from base 102. Wedges 216 and crowders 226 are at maximum extension. Top cover holder lever arm 232 has moved to its maximum extension. Angular compliance 234 connects lever arm 232 to vacuum plate 236. Vacuum plate 236 supports four suction cups 238, which, in turn, support top cover 104. Disc drive 100 is open to plainly show base 102, gasket 105, and top cover 104.

FIG. 3 illustrates a specific embodiment of the invention. In different embodiments, one or two floating wedges 216 are mounted on a side of disc drive 100 where gasket 105 is not close to the top cover 104 edge or where access is available. A single wedge 216 or multiple wedges can be used. As floating wedge 216 is pushed in to the gap between top cover 104 and disc drive base 102, floating wedge 216 adjusts itself by floating. The bottom surface of wedge 216 retains disc drive 100 in place by pushing downwards and the angled top surface pries the top cover 104 and breaks the gasket bond.

Two crowders 226 are mounted on the side opposite wedge 216, where the gasket 105 is close to the top cover 104 edge. As crowders 226 are extended to the gap between top cover 104 and disc drive base 102, crowders 226 push top cover 104 to break the gasket bond and keep the drive base 102 in place by holding on to the edge. The joint action of wedge 216 and crowder 226 eliminates the need for any additional holding device for gripping drive 100 and eliminates the need for any other features on the base 102 to avoid lifting drive 100 with top cover 104.

A unique vacuum top cover lift system is pivotable opposite to the wedge side, to lift the top cover 104. FIG. 3 shows the details of top cover lift sub-assembly 206. Sub-assembly 206 contains vacuum plate 236, which holds 4 suction cups 238 and is attached to lever arm 232 with angular compliance 234. Lever arm 232 is attached to pivot mechanism 230 (not shown). Guard plate 240 is attached to vacuum plate 236 to keep top cover 104 from dropping at the lift position if vacuum is turned off. In addition, FIG. 3 also illustrates a nest 303. Nest 303 assists alignment of base 102 with apparatus 200.

FIG. 4 is a side view of an embodiment of the floating wedge subassembly. Floating wedge sub-assembly 202 comprises a wedge pneumatic slide 208, a mount plate 210, a wedge bracket 212, a shoulder bolt 214 and a floating wedge 216. Floating wedge 216 has a 30° main angle 402 and a 15° angle at the bottom surface 404 and is made of hardened 400 series stainless steel with highly polished surfaces. Wedge 216 is mounted on bracket 212 with 2 slip fit shoulder bolts 214 through a hole and slot on wedge 216; this arrangement allows wedge 216 to float.

Wedge 216 and bracket 212 are attached to a pneumatic slide 208 through mount plate 210, this arrangement provides wedge height set feature for initial alignment, as bracket 212 has 2 slots for mounting to mount plate 210.

FIG. 5 is an isometric view of an embodiment of floating wedge sub-assembly 202 and its alignment with base 102 of disc drive 100. FIG. 5 shows the one time (initial) floating wedge 216 alignment to the disc drive base 102. Floating wedge bottom surface 404 is kept about 0.005 to 0.010 inch below the base 102 top surface 502. Top surface 502, can be a lip along the edge of base 102. In one embodiment, top surface 502 is angled downward at more than 45 degrees from the horizontal. Top surface 502 does not extend to gasket 105. The shape and location of top surface 502 permits floating wedge bottom surface 404 to fully engage top surface 502 without coming into contact with gasket 105.

FIG. 6 is a side view of an embodiment of crowder sub-assembly 204. Crowder sub-assembly 204 comprises crowder pneumatic slide 218, mount plate 220, crowder bracket 222, crowder block 224 and o-ring crowder 226.

Crowder 226 is mounted on crowder block 224 and attached to pneumatic slide 218 through crowder bracket 222 and mount plate 220. This arrangement provides crowder height set feature for initial alignment similar to floating wedge sub-assembly.

FIG. 7 is a block diagram of an embodiment of the apparatus. Apparatus 700 is comprised of three sub-assemblies: a wedge 702, a crowder 704, and a top cover holder 706. FIG. 7 shows that controller 244 interfaces with wedge 702, crowder 704, and top cover holder 706. Other embodiments of the apparatus may interface controller 244 differently or even delete controller 244 entirely. FIG. 7 shows how the components of apparatus 700 relate to base 102 and top cover 104 of disc drive 100.

FIG. 8 is a block diagram of a method for implementing the invention. Method 800 is comprised of five steps. A step 802 is placing disc drive 100 in apparatus 200. A step 804 is fitting wedge 216 between top cover 104 and disc drive base 102. A step 806 is driving wedge 216 between top cover 104 and disc drive base 102. A step 808 is supporting disc drive 100 with crowder 226 to oppose driving force imposed by wedge 216. A step 810 is remove top cover 104 with top cover holder 240.

The present invention can be summarized in reference with the figures. In some embodiments an apparatus (such as 200) for separating a top cover (such as 104) from a base (such as 102) of a disc drive (such as 100) comprises a wedge (such as 216) to fit between the top cover (such as 104) and the base (such as 102) of the disc drive (such as 100) and an actuator (such as 242) to drive the wedge (such as 216) with a sufficient driving force to separate the top cover (such as 104) from the base (such as 102) of the disc drive (such as 100). The embodiments also include a crowder (such as 226) to support the disc drive (such as 100), wherein the crowder (such as 226) opposes the driving force imparted to the disc drive (such as 100) by the actuator (such as 242), and a top cover holder (such as 240) to remove the top cover (such as 104).

Some embodiments further include a controller (such as 244) to operate the apparatus (such as 200). Some embodiments further include that the wedge (such as 216) is a floating wedge or a plurality of wedges. Some embodiments further include that the crowder (such as 226) comprises features configured to break the gasket bond, to hold down the base (such as 102) in opposition to a lifting force imposed on the base (such as 102) by the top cover holder (such as 206), or includes at least one additional crowder.

Some embodiments further include that the top cover holder (such as 206) comprises a vacuum suction system.

In some embodiments, a method of removing a top cover (such as 104) from a base (such as 102) of a disc drive (such as 100), comprises fitting a wedge (such as 216) between the top cover (such as 104) and the base (such as 102) of the disc drive (such as 100) and driving the wedge (such as 216) with sufficient driving force to separate the top cover (such as 104) from the base (such as 102) of the disc drive (such as 100), wherein an actuator (such as 242) provides the driving force. The embodiments also include supporting the disc drive (such as 100) with a crowder (such as 226) to oppose the driving force imparted to the disc drive (such as 100) by the actuator (such as 242) and removing the top cover (such as 104) with a top cover holder (such as 206).

Some embodiments further include operating the apparatus (such as 200) with a controller (such as 244). Some embodiments further include that driving the wedge (such as 216) comprises driving a floating wedge or driving a plurality of wedges. Some embodiments further include breaking the gasket bond with the crowder (such as 226), holding down the base (such as 102) with the crowder (such as 226) in opposition to a lifting force imposed on the base (such as 102) by the top cover holder (such as 206), or supporting a disc drive (such as 100) with a plurality of crowders. Some embodiments further include that removing the top cover (such as 104) with a top cover holder (such as 206) further comprises removing the top cover (such as 104) with a top cover holder (such as 206) configured to incorporate a vacuum suction system.

In some embodiments, an apparatus (such as 200) comprises a wedge (such as 216), a crowder (such as 226), a top cover holder (such as 206), and means for separating a top cover (such as 104) from a base (such as 102) of a disc drive (such as 100).

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the top cover removal system while maintaining substantially the same functionality without departing from the scope and spirit of the present invention. In addition, although the preferred embodiment described herein is directed to a top cover removal system for disc drives, it will be appreciated by those skilled in the art that the teachings of the present invention can be applied to any gasket sealed electronics, without departing from the scope and spirit of the present invention.

What is claimed is:

1. An apparatus for separating a top cover from a base of a disc driving comprising:
   a wedge configured to fit between the top cover and the base of the disc drive, wherein the wedge comprises a floating wedge;
   an actuator configured to drive the wedge with a sufficient driving force to separate the top cover from the base of the disc drive;
   a crowder configured to support the disc drive, wherein the crowder is disposed to oppose the driving force imparted to the disc drive by the actuator; and a top cover holder configured to remove the top cover.

2. The apparatus of claim 1 further comprising a controller configured to operate the apparatus.

3. The apparatus of claim 1 wherein the wedge comprises a plurality of wedges.

4. The apparatus of claim 1 wherein the crowder comprises features configured to break the gasket bond.

5. The apparatus of claim 1 wherein the crowder comprises features configured to hold down the base in opposition to a lifting force imposed on the base by the top cover holder.

6. The apparatus of claim 1 wherein the crowder includes at least one additional crowder.

7. The apparatus of claim 1 wherein the top cover holder comprises a vacuum suction system.

8. The apparatus of claim 1 including a pneumatic actuator configured to urge the wedge and a controller configured to control operation of the pneumatic actuator.

9. A method of removing a top cover from a base of a disc drive, comprising:

fitting a floating wedge between the top cover and the base of the disc drive and allowing the floating wedge to move into alignment between the top cover and the base;

driving the floating wedge with sufficient driving force to separate the top cover from the base of the disc drive, wherein an actuator provides the driving force;

supporting the disc drive with a crowder disposed to oppose the driving force imparted to the disc drive by the actuator; and removing the top cover with a top cover holder.

10. The method of claim 9 further comprising operating the apparatus with a controller.

11. The method of claim 10 wherein the controller operates a pneumatic actuator to drive the wedge.

12. The apparatus of claim 11 including a controller means for controlling operation of the pneumatic actuator means and automating removal of the top cover.

13. The method of claim 9 wherein driving the wedge further comprises driving a plurality of wedges.

14. The method of claim 9 further comprising breaking the gasket bond with the crowder.

15. The method of claim 9 further comprising holding down the base with the crowder in opposition to a lifting force imposed on the base by the top cover holder.

16. The method of claim 9 wherein supporting the disc drive with a crowder further comprises supporting a disc drive with a plurality of crowders.

17. The method of claim 9 wherein removing the top cover with a top cover holder further comprises removing the top cover with a top cover holder configured to incorporate a vacuum suction system.

18. An apparatus for separating a top cover from a base of a disc drive comprising:

floating wedge means for aligning a tie between the top cover and the base and for separating the top cover from the base of the disc drive by wedegedly engaging the interface between the cover and the base;

crowder means for opposing the wedge and holding the base; and means for holding and removing the top cover upon separation from the base.

19. The apparatus of claim 18 including a pneumatic actuator means for driving the floating wedge means.

* * * * *